(12) United States Patent
Kithuka

(10) Patent No.: US 9,316,801 B1
(45) Date of Patent: Apr. 19, 2016

(54) COMMUNICATION CABLES INCORPORATING TWISTED PAIR SEPARATORS

(71) Applicant: Superior Essex Communications LP, Atlanta, GA (US)

(72) Inventor: Jones Kithuka, Acworth, GA (US)

(73) Assignee: Superior Essex International LP, Atlanta, GA (US)

( * ) Notice: Subject to any disclaimer, the term of this patent is extended or adjusted under 35 U.S.C. 154(b) by 144 days.

(21) Appl. No.: 14/057,242

(22) Filed: Oct. 18, 2013

(51) Int. Cl.
*G02B 6/44* (2006.01)
*H01B 11/08* (2006.01)

(52) U.S. Cl.
CPC .............. *G02B 6/441* (2013.01); *G02B 6/4407* (2013.01); *G02B 6/4434* (2013.01); *G02B 6/4495* (2013.01); *H01B 11/08* (2013.01)

(58) Field of Classification Search
CPC .. G02B 6/441–6/4414; G02B 6/4407–6/4408; G02B 6/4435; G02B 6/4495; H01B 11/06–11/085
See application file for complete search history.

(56) References Cited

U.S. PATENT DOCUMENTS

| 1,883,269 | A | 10/1932 | Yonkers |
| 6,506,976 | B1 | 1/2003 | Neveux |
| 7,214,883 | B2 | 5/2007 | Leyendecker |
| 7,999,184 | B2 | 8/2011 | Wiebelhaus et al. |
| 2012/0301089 | A1 | 11/2012 | Camp et al. |
| 2013/0014972 | A1 | 1/2013 | Wiebelhaus |
| 2014/0251652 | A1 | 9/2014 | Poulsen |

OTHER PUBLICATIONS

Non-Final Office Action for U.S. Appl. No. 13/917,164, mailed on Oct. 23, 2014.
Office Action mailed on May 21, 2015 for U.S. Appl. No. 13/917,164.

*Primary Examiner* — Jerry Rahll

(57) ABSTRACT

Twisted pair communication cables incorporating twisted pair separators are described. A cable may include at least one twisted pair of insulated conductors extending lengthwise. A dielectric separator may also extend lengthwise within the cable, and a cross-section of the separator may include at least two portions positioned at an angle to one another. The portions of the separator may form one or more cavities in which one or more corresponding conductors of the twisted pair may be positioned or situated. A jacket may then be formed around the twisted pair and the separator.

24 Claims, 8 Drawing Sheets

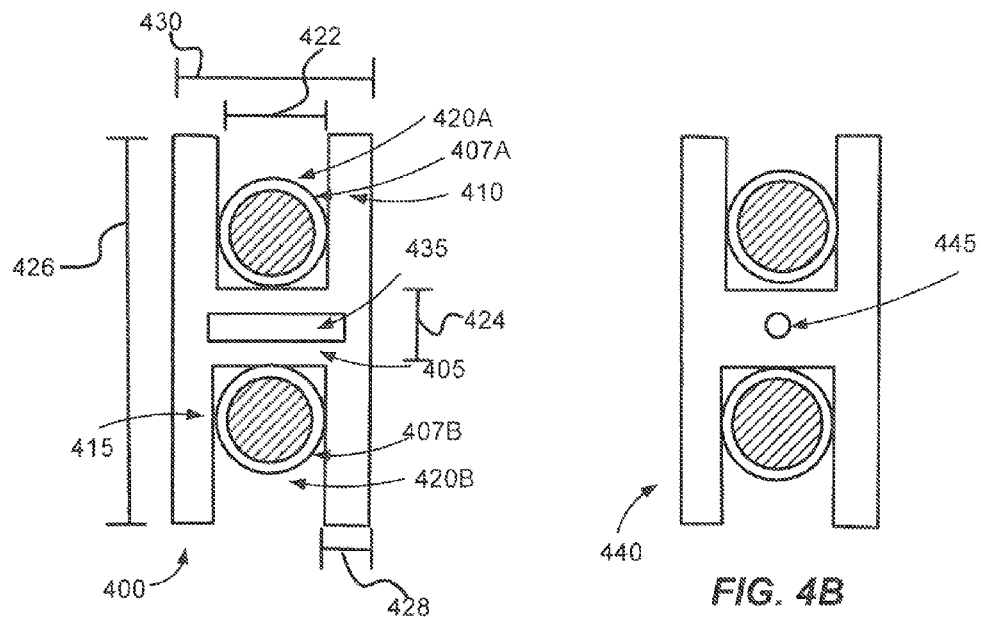
FIG. 4A
FIG. 4B
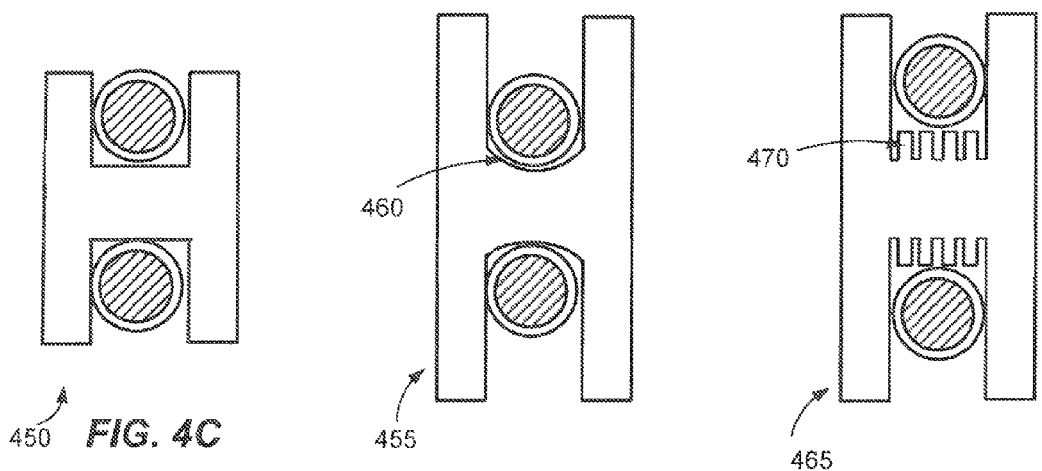
FIG. 4C
FIG. 4D
FIG. 4E

COMMUNICATION CABLES INCORPORATING TWISTED PAIR SEPARATORS

CROSS-REFERENCE TO RELATED APPLICATION

The present application is related to pending U.S. patent application Ser. No. 13/917,164, filed Jun. 13, 2013 and entitled "Shielded Twisted Pair Communication Cables", the contents of which is incorporated herein by reference in its entirety.

TECHNICAL FIELD

Embodiments of the disclosure relate generally to twisted pair communication cables and, more particularly, to twisted pair communication cables incorporating dielectric separators between the individual conductors of one or more twisted pairs.

BACKGROUND

A wide variety of different types of communication cables and composite cables incorporate twisted pair conductors. In twisted pair cables, signal performance may be degraded due to a wide variety of factors, including signal attenuation and crosstalk. Crosstalk typically occurs when a signal transmitted on one channel (e.g., a first twisted pair) creates an undesired effect in another channel (e.g., a second twisted pair). Crosstalk is usually caused by undesired capacitive, inductive, or conductive coupling from one channel to another.

A wide variety of applicable cable standards, such as Telecommunication Industry Association ("TIA") standards, Electronic Industries Alliance ("EIA") standards, American Nation Standards Institute ("ANSI") standards, International Organization for Standardization ("ISO") standards, and/or International Electrotechnical Commission ("IEC") standards, specify performance parameters for twisted pair cables. For example, cable standards may specify acceptable crosstalk performance parameters for various types of twisted pair communication cables. Additionally, as bandwidth requirements increase for cables, it is often necessary to improve crosstalk performance.

Typically, crosstalk may be reduced in a cable by maintaining a relatively consistent cable construction and by maintaining relatively consistent conductor separation dimensions along a longitudinal length of the cable. In certain conventional cables, such as cables described in U.S. Pat. No. 6,506,976 and U.S. Pat. Pub. No. 2013/0014972, dielectric films have been positioned between the individual conductors of twisted pairs in an attempt to reduce crosstalk. However, with conventional dielectric film separators, the individual conductors of a twisted pair are subject to various tensions and forces exerted on the cable, such as compressive forces. These forces may cause the conductors to shift or move along one or multiple axes, thereby resulting in degraded and/or inconsistent cable performance. The performance degradations may be greater at higher frequencies. Accordingly, there is an opportunity for improved twisted pair cables that incorporate dielectric separators between the individual conductors of one or more twisted pairs.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

FIGS. 4A-4E are cross-sectional views of example dielectric separators that may be utilized in conjunction with a twisted pair, according to illustrative embodiments of the disclosure.

DETAILED DESCRIPTION

Figure 1:
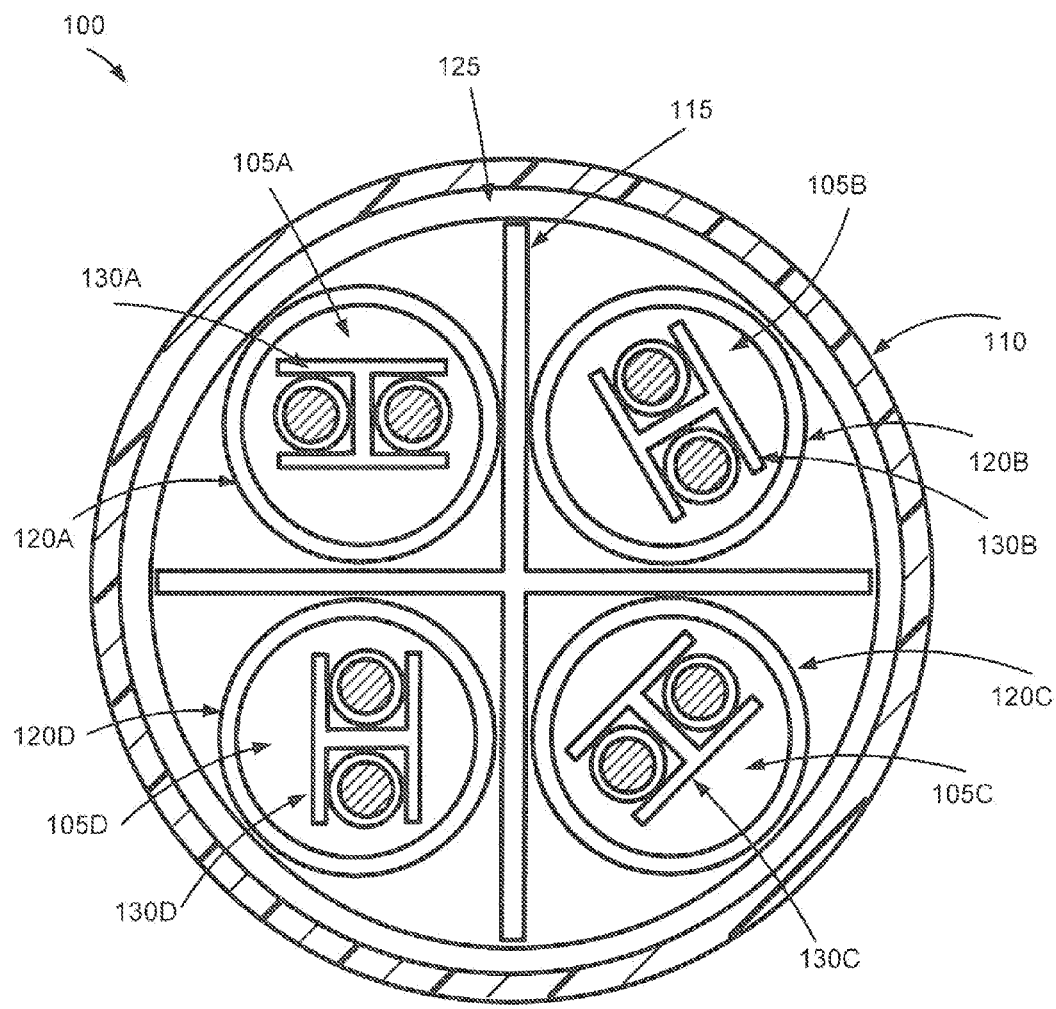
FIGS. 1-3 are cross-sectional views of example twisted pair cables, according to illustrative embodiments of the disclosure.

Various embodiments of the present disclosure are directed to twisted pair communication cables incorporating one or more dielectric separators between the individual conductors of one or more twisted pairs. For example, a dielectric separator may be positioned between the individual insulated conductors of a twisted pair, and the dielectric separator may extend lengthwise or in a longitudinal direction. According to an aspect of the disclosure, the dielectric separator may be formed with a cross-section that assists in maintaining the position of the individual conductors of the twisted pair. In other words, the dielectric separator may reduce or limit the ability of the individual conductors to shift, slide, or otherwise move in the event that certain forces, such as compressive forces, are exerted on the cable.

A wide variety of suitable constructions and/or dimensions may be utilized in association with a dielectric separator. For example, a dielectric separator may be formed with a wide variety of suitable cross-sections. In certain embodiments, a dielectric separator may be formed such that the cross-section includes a first portion positioned between the insulated conductors of a twisted pair and one or more additional portions extending at one or more respective angles from the first portion. For example, the separator may be formed with an H-shape, a T-shape, an X-shape, a Z-shape, an S-shape, a K-shape, or any other suitable cross-sectional shape. Additionally, each of the portions of the dielectric separator may have any suitable dimensions (e.g., widths, lengths, etc.). In certain embodiments, both a first portion and a second portion may have a length (i.e., a measured length taken along a given cross-section of the separator) that is greater than or equal to one half the diameter of an insulated conductor of the twisted pair. In other words, if an individual conductor of the twisted pair has a diameter (e.g., a combined diameter of the conductor and insulation) of approximately 0.04 inches, then each of the first and second portions may have a length that is at least approximately 0.02 inches. In certain embodiments, portions having lengths that are approximately equal to, greater than, and/or substantially greater than the diameter of an insulated conductor may be beneficial in limiting movement of the conductors of a twisted pair.

In other embodiments, a dielectric separator may be formed such that the cross-section includes two portions that are positioned or joined at an angle to one another. For example, a dielectric separator may include a first portion and a second portion connected at an angle to the first portion. One or more additional portions may also be provided as desired, such as a third portion connected at an angle to the first portion or the second portion. Each portion may have any suitable lengths and/or other dimensions. Additionally, the dielectric separator may form at least one cavity in which one of the insulated conductors is situated. In certain embodiments, a dielectric separator may form a respective cavity for each of the conductors. For example, a dielectric separator may be formed with an approximately H-shaped cross-section or an approximately X-shaped cross-section, and individual conductors may be positioned in the cavities formed in the top and bottom of the "H" or "X". Similarly, a dielectric separator may be formed with an approximately S-shaped cross-section, approximately E-shaped cross-section, or any other suitable cross-section in which individual conductors can be positioned within respective cavities.

A wide variety of other features may be incorporated into dielectric separators as desired in various embodiments. For example, in certain embodiments, electrically conductive material (e.g., a tape containing electrically conductive material, etc.) may be incorporated into a dielectric separator. As another example, one or more strength members (e.g., strength yarns, strength rods, etc.) may be incorporated into a dielectric separator. As yet other examples, water absorbing material, flame retardant material, smoke suppressants, and/or other suitable components and/or materials may be incorporated into a dielectric separator. Additionally, in certain embodiments, one or more transmission media may be embedded or otherwise incorporated into a dielectric separator. For example, one or more optical fibers may be embedded in a dielectric separator or positioned in one or more longitudinal cavities formed in the dielectric separator.

Additionally, in certain embodiments, a dielectric separator may be subjected to one or more processes and/or formation techniques that increase the flexibility of the dielectric separator and/or assist a technician in breaking the separator during installation of a cable. For example, a dielectric separator may be scored or partially serrated at one or more positions (e.g., at regular intervals, etc.) along the longitudinal length of the separator. As another example, one or more notches may be formed in the separator at one or more positions along a longitudinal length of the separator. As yet another example, the separator may be severed into a plurality of discrete segments or formed as a plurality of discrete segments that are positioned end to end along a longitudinal length of the cable.

As a result of providing dielectric separators or separation elements between the individual conductors of one or more twisted pairs, a relatively consistent conductor separation may be maintained along a longitudinal length of a cable. Additionally, one or more cavities formed by the dielectric separators may assist in maintaining the position(s) of one or more conductors when stresses are applied to the cable. As a result, the cable may exhibit improved electrically performance and/or lower losses due to crosstalk (e.g., near end crosstalk, far end crosstalk, etc.) relative to conventional twisted pair cables.

Embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

With reference to FIG. 1, a cross-section of an example cable 100 that may be utilized in various embodiments is illustrated. The cable 100 is illustrated as a communications cable; however, other types of cables may be utilized. The cable 100 may include a wide variety of suitable transmission media, such as one or more twisted pairs, one or more optical fibers, one or more coaxial cables, and/or one or more power conductors. As illustrated in FIG. 1, the cable 100 may include a plurality of twisted pairs of electrical conductors 105A-D. In other embodiments, the cable 100 may include a combination of twisted pairs and one or more other types of transmission media (e.g., optical fibers, etc.). Additionally, an outer jacket 110 may be formed around the twisted pairs 105A-D and the shielding elements.

Any number of twisted pairs may be utilized as desired in the cable 100. As shown in FIG. 1, the cable 100 may include four twisted pairs 105A, 105B, 105C, 105D. As desired, all of the twisted pairs may be twisted or bundled together and/or suitable bindings may be wrapped around the twisted pairs. In other embodiments, multiple grouping of twisted pairs may be incorporated into a cable. As desired, each grouping may be twisted, bundled, and/or bound together. Further, in certain embodiments, the multiple groupings may be twisted, bundled, or bound together. Additionally, embodiments of the disclosure may be utilized in association with horizontal cables, vertical cables, flexible cables, equipment cords, cross-connect cords, plenum cables, riser cables, or any other appropriate cables.

Each twisted pair (referred to generally as twisted pair 105 or collectively as twisted pairs 105) may include two electrical conductors, each covered with suitable insulation. As desired, each of the twisted pairs may have the same twist lay length or alternatively, at least two of the twisted pairs may include a different twist lay length. For example, each twisted pair 105A-D may have a different twist rate. The different twist lay lengths may function to reduce crosstalk between the twisted pairs. As desired, the differences between twist rates of twisted pairs 105 that are circumferentially adjacent one another (for example the twisted pair 105A and the twisted pair 105B) may be greater than the differences between twist rates of twisted pairs 105 that are diagonal from one another (for example the twisted pair 105A and the twisted pair 105C). As a result of having similar twist rates, the twisted pairs that are diagonally disposed can be more susceptible to crosstalk issues than the twisted pairs that are circumferentially adjacent; however, the distance between the diagonally disposed pairs may limit the crosstalk. Thus, the different twist lengths and arrangements of the pairs can help reduce crosstalk among the twisted pairs 105. Additionally, in certain embodiments, each of the twisted pairs 105A-D may be twisted in the same direction (e.g., clockwise, counter clockwise). In other embodiments, at least two of the twisted pairs 105A-D may be twisted in opposite directions.

The electrical conductors may be formed from any suitable electrically conductive material, such as copper, aluminum, silver, annealed copper, gold, or a conductive alloy. Additionally, the electrical conductors may have any suitable diameter, gauge, and/or other dimensions. For example, the electrical conductors may be formed as approximately 23 American Wire Gauge ("AWG") conductors, approximately 24 AWG conductors, or as conductors having any other suitable gauge. In certain embodiments, the electrical conductors may be formed as solid conductors. In other embodiments, the electrical conductors may be formed from a plurality of electrical conductive strands that are twisted together.

The insulation may include any suitable dielectric materials and/or combination of materials, such as one or more polymeric materials, one or more polyolefins (e.g., polyethylene, polypropylene, etc.), one or more fluoropolymers (e.g., fluorinated ethylene propylene ("FEP"), melt processable fluoropolymers, MFA, PFA, ethylene tetrafluoroethylene ("ETFE"), ethylene chlorotrifluoroethylene ("ECTFE"), etc.), one or more polyesters, polyvinyl chloride ("PVC"), one or more flame retardant olefins (e.g., flame retardant polyethylene ("FRPE"), flame retardant polypropylene ("FRPP"), a low smoke zero halogen ("LSZH") material, etc.), polyurethane, neoprene, cholorosulphonated polyethylene, flame retardant PVC, low temperature oil resistant PVC, flame retardant polyurethane, flexible PVC, or a combination of any of the above materials. In certain embodiments, the insulation may be formed from multiple layers of a plurality of suitable materials. In other embodiments, the insulation may be formed from one or more layers of foamed material. As desired, different foaming levels may be utilized in accordance with twist lay length to result in insulated twisted pairs having an equivalent or approximately equivalent overall diameter. In certain embodiments, the insulation may additionally include other materials, such as a flame retardant material and/or a smoke suppressant material.

Additionally, in certain embodiments, the insulation of each of the electrical conductors utilized in the twisted pairs 105A-D may be formed from similar materials. In other embodiments, at least two of the twisted pairs may utilize different insulation materials. For example, a first twisted pair may utilize an FEP insulation while a second twisted pair utilizes a non-FEP polymeric insulation. In yet other embodiments, the two conductors that make up a twisted pair may utilize different insulation materials.

Each twisted pair 105A-D can carry data or some other form of information, for example in a range of about one to ten Giga bits per second ("Gbps") or another appropriate frequency, whether faster or slower. In certain embodiments, each twisted pair 105A-D supports data transmission of about two and one-half Gbps (e.g. nominally two and one-half Gbps), with the cable 100 supporting about ten Gbps (e.g. nominally ten Gbps). In certain embodiments, each twisted pair 105A-D supports data transmission of about ten Gbps (e.g. nominally ten Gbps), with the cable 100 supporting about forty Gbps (e.g. nominally forty Gbps).

The jacket 110 may enclose the internal components of the cable 100, seal the cable 100 from the environment, and provide strength and structural support. The jacket 110 may be formed from a wide variety of suitable materials and/or combinations of materials, such as one or more polymeric materials, one or more polyolefins (e.g., polyethylene, polypropylene, etc.), one or more fluoropolymers (e.g., fluorinated ethylene propylene ("FEP"), melt processable fluoropolymers, MFA, PFA, ethylene tetrafluoroethylene ("ETFE"), ethylene chlorotrifluoroethylene ("ECTFE"), etc.), one or more polyesters, polyvinyl chloride ("PVC"), one or more flame retardant olefins (e.g., flame retardant polyethylene ("FRPE"), flame retardant polypropylene ("FRPP"), a low smoke zero halogen ("LSZH") material, etc.), polyurethane, neoprene, cholorosulphonated polyethylene, flame retardant PVC, low temperature oil resistant PVC, flame retardant polyurethane, flexible PVC, or a combination of any of the above materials. The jacket 110 may be formed as a single layer or, alternatively, as multiple layers. In certain embodiments, the jacket 110 may be formed from one or more layers of foamed material. As desired, the jacket 110 can include flame retardant and/or smoke suppressant materials. Additionally, the jacket 110 may include a wide variety of suitable shapes and/or dimensions. For example, the jacket 110 may be formed to result in a round cable or a cable having an approximately circular cross-section; however, the jacket 110 and internal components may be formed to result in other desired shapes, such as an elliptical, oval, or rectangular shape. The jacket 110 may also have a wide variety of dimensions, such as any suitable or desirable outer diameter and/or any suitable or desirable wall thickness. In various embodiments, the jacket 110 can be characterized as an outer jacket, an outer sheath, a casing, a circumferential cover, or a shell.

An opening enclosed by the jacket 110 may be referred to as a cable core, and the twisted pairs 105A-D may be disposed within the cable core. Although a single cable core is illustrated in the cable 100 of FIG. 1, a cable may be formed to include multiple cable cores. For example, a jacket may be extruded to include multiple cavities. In certain embodiments, the cable core may be filled with a gas such as air (as illustrated) or alternatively a gelatinous, solid, powder, moisture absorbing material, water-swellable substance, dry filling compound, or foam material, for example in interstitial spaces between the twisted pairs 105A-D. Other elements can be added to the cable core as desired, for example one or more optical fibers, additional electrical conductors, additional twisted pairs, and/or strength members, depending upon application goals.

In certain embodiments, the cable 100 may also include one or more shielding elements. Shielding elements may include, for example, one or more shield layers wrapped around or enclosing one or more of the twisted pairs 105A-D and/or a separation filler 115 positioned between one or more twisted pairs and incorporating shielding material. As shown in FIG. 1, each twisted pair 105A-D may be individually shielded in certain embodiments. For example, a first shield 120A or shield layer may be provided for a first twisted pair 105A, a second shield 120B may be provided for a second twisted pair 105B, a third shield 120C may be provided for a third twisted pair 105C, and a fourth shield 120D may be provided for a fourth twisted pair 105D. In alternative embodiments, shield layers may be provided for any desired groupings of twisted pairs. For example, a first shield may be provided for two of the twisted pairs while a second shield is provided for the other two twisted pairs. Additionally, in certain embodiments, an external shield 125 may be provided that encompasses all of the twisted pairs 105 and/or other cable components. For example, in certain embodiments, an external shield 125 may be positioned between the twisted pairs 105 and the outer jacket 110. In other embodiments, an external shield may be embedded or incorporated into the outer jacket 110. Indeed, in various embodiments, any desired shield, combinations of shields, and/or groups of shielding components may be utilized. In other embodiments, the cable may be formed without any shields or other shielding components. Further, in certain embodiments, the cable 100 may include a separate, armor layer (e.g., a corrugated armor, etc.) for providing mechanical protection.

A shield layer, such as an external shield 125 or an individual twisted pair shield 120A-D, may be formed from a wide variety of suitable materials and/or utilizing a wide variety of suitable techniques. In certain embodiments, a shield layer may be formed as an electrically conductive layer (e.g., a metallic layer), as an electrically conductive foil, or as a braided shield layer. For example, a relatively solid metallic shield layer may be utilized to form a continuous shield. In operation, the shield layer may be grounded when the cable 100 is deployed. In other embodiments, a shield layer may be formed as a plurality of layers. For example, electrically conductive material may be formed on a dielectric substrate to form a shield layer. As desired, the electrically conductive material may include discrete patches of material, thereby resulting in a discontinuous shield. In yet other embodiments, a shield layer may be formed from or may include a semi-conductive material. Additionally, in certain embodiments, a shield layer may be formed as a continuous layer along a longitudinal length of the cable 100. In other embodiments, a shield layer may include a plurality of separate segments or components along a longitudinal length of the cable 100. As desired, one or more adjacent shield layer components may overlap one another along shared longitudinal edges. Alternatively, spaces or gaps may be present between certain shield layer components.

In certain embodiments, the cable 100 may also include a separator 115 or filler configured to orient and or position one or more of the twisted pairs 105. The orientation of the twisted pairs 105 relative to one another may provide beneficial signal performance. As desired in various embodiments, the separator 115 may be formed in accordance with a wide variety of suitable dimensions, shapes, or designs. For example, a rod-shaped separator, a flat tape separator, a flat separator, an X-shaped or cross-shaped separator, a T-shaped separator, a Y-shaped separator, a J-shaped separator, an L-shaped separator, a diamond-shaped separator, a separator having any number of spokes extending from a central point, a separator having walls or channels with varying thicknesses, a separator having T-shaped members extending from a central point or center member, a separator including any number of suitable fins, and/or a wide variety of other shapes may be utilized. In certain embodiments, material may be cast or molded into a desired shape to form the separator 115. In other embodiments, a tape may be formed into a desired shape utilizing a wide variety of folding and/or shaping techniques. For example, a relatively flat tape separator may be formed into an X-shape or cross-shape as a result of being passed through one or more dies.

In certain embodiments, the separator 115 may be continuous along a length of the cable 100. In other embodiments, the separator 115 may be non-continuous or discontinuous along a length of the cable 100. In other words, the separator 115 may be separated, segmented, or severed in a longitudinal direction such that discrete sections or portions of the separator 115 are arranged longitudinally (e.g., end to end) along a length of the cable 100. Use of a non-continuous or segmented separator may enhance the flexibility of the cable 100, reduce an amount of material incorporated into the cable 100, and/or reduce the cable cost.

In the event that a discontinuous separator 115 is utilized, the various portions or segments of the separator 115 may include a wide variety of different lengths and/or sizes. In certain embodiments, each of the separator segments or portions may have lengths that are approximately equal. In other embodiments, various portions of the separator 115 may have varying lengths. These varying lengths may follow an established pattern or, alternatively, may be incorporated into the cable 100 at random. In certain embodiments, gaps or spaces may be present in the longitudinal direction of the cable 100 between two consecutive or adjacent portions of the separator 115. In other embodiments, adjacent portions of the separator 115 may be permitted to contact one another. In yet other embodiments, gaps may be present between some adjacent portions of the separator 115 while other adjacent portions are permitted to contact one another. Additionally, a wide variety of suitable gap sizes may be utilized as desired in various embodiments, and the gap sizes may be approximately equal, varied in accordance with any desired pattern, or varied at random. In certain embodiments, the gaps may be small enough to prevent the twisted pairs 105 from contacting each other in the interstitial spaces between portions of the separator 115.

The separator 115 may be formed from a wide variety of suitable materials as desired in various embodiments. For example, the separator 115 and/or various separator segments can include paper, metals, alloys, various plastics, one or more polymeric materials, one or more polyolefins (e.g., polyethylene, polypropylene, etc.), one or more fluoropolymers (e.g., fluorinated ethylene propylene ("FEP"), melt processable fluoropolymers, MEA, PFA, ethylene tetrafluoroethylene ("ETFE"), ethylene chlorotrifluoroethylene ("ECTFE"), etc.), one or more polyesters, polyvinyl chloride ("PVC"), one or more flame retardant olefins (e.g., flame retardant polyethylene ("FRPE"), flame retardant polypropylene ("FRPP"), a low smoke zero halogen ("LSZH") material, etc.), polyurethane, neoprene, cholorosulphonated polyethylene, flame retardant PVC, low temperature oil resistant PVC, flame retardant polyurethane, flexible PVC, or any other suitable material or combination of materials. As desired, the separator 115 may be filled, unfilled, foamed, un-foamed, homogeneous, or inhomogeneous and may or may not include additives (e.g., flame retardant and/or smoke suppressant materials).

In certain embodiments, each segment or portion of the separator 115 may be formed from similar materials. In other embodiments, a separator 115 may make use of alternating materials in adjacent portions (whether or not a gap is formed between adjacent portions). For example, a first portion or segment of the separator 115 may be formed from a first set of one or more materials, and a second portion or segment of the separator 115 may be formed from a second set of one or more materials. As one example, a relatively flexible material may be utilized in every other portion of a separator 115. As another example, flame retardant material may be selectively incorporated into desired portions of a separator 115. In this regard, material costs may be reduced while still providing adequate flame retardant qualities.

In certain embodiments, a separator 115 (or various separator segments) may include or incorporate electrically conductive material that functions as a shield (or partial shield). For example, a separator 115 may include electrically conductive material, such as one or more metallic patches (or other suitable conductive material) formed on or adhered to a dielectric substrate or base. As another example, a separator 115 may include electrically conductive material embedded into or impregnated into a dielectric material. As yet another example, a separator 115 may include relatively solid sections of electrically conductive material, such as discrete electrically conductive segments incorporated into a segmented separator or electrically conductive sections incorporated into a continuous separator (or various separator segments of a discontinuous separator). Similar to a shield layer, a separator 115 may utilize a wide variety of different configurations of electrically conductive material in order to provide shielding. In certain embodiments, electrically conductive material incorporated into a separator 115 (or separator segment) may be continuous or relatively continuous along a length of the separator 115. In other embodiments, discontinuous patches of electrically conductive material may be incorporated into the separator 115 and/or various separator segments. In yet other embodiments, semi-conductive material may be incorporated into the separator 115.

As set forth above, a wide variety of different types of shielding elements and/or combinations of shielding elements may be incorporated into a cable 100. These shielding elements may utilize a wide variety of different materials and/or have a wide variety of suitable configurations. For example, a wide variety of suitable electrically conductive materials or combination of materials may be utilized in a shielding element including, but not limited to, metallic material (e.g., silver, copper, annealed copper, gold, aluminum, etc.), metallic alloys, conductive composite materials, etc. Indeed, suitable electrically conductive materials may include any material having an electrical resistivity of less than approximately $1 \times 10^{-7}$ ohm meters at approximately 20° C., such as an electrical resistivity of less than approximately $3 \times 10^{-8}$ ohm meters at approximately 20° C. In the event that discontinuous patches or sections of electrically conductive material are utilized, the patches may have any desired dimensions, such as any desired lengths and/or thicknesses. Further, any desired gaps or spaces may be positioned between adjacent patches. Further, electrically conductive material incorporated into a shield element may have a wide variety of suitable arrangements and/or shapes.

As desired, a wide variety of suitable techniques and/or processes may be utilized to form a shield element. For example, a separator 115 may be formed by extruding, protruding, or otherwise forming a base dielectric layer, and electrically conductive material may then be applied or adhered to the base material. In other embodiments, electrically conductive material may be injected into the base material. In yet other embodiments, dielectric material may be formed or extruded over electrically conductive material to form a separator 115. As desired, a base layer may have a substantially uniform composition and/or may be made of a wide range of materials. Additionally, the base layer may be fabricated in any number of manufacturing passes, such as a single manufacturing pass. Further, the base layer may be foamed, may be a composite, and/or may include one or more strength members, fibers, threads, or yarns. As desired, flame retardant material, smoke suppressants, and/or other desired substances may be blended or incorporated into the base layer. Additionally, as desired, the base layer may be hollow to provide a cavity that may be filled with air or some other gas, gel, fluid, moisture absorbent, water-swellable substance, dry filling compound, powder, one or more optical fibers, one or more metallic conductor (e.g., a drain wire, etc.), shielding, or some other appropriate material or element. Indeed, a wide variety of suitable techniques may be utilized to incorporate electrically conductive material into a separator 115. In other embodiments, a separator 115 may be substantially free of electrically conductive material. For example, a separator 115 may be formed from dielectric material.

In certain embodiments, a shielding element, such as a shield layer (e.g., an external shield layer 125, an individual twisted pair shield 120A-D, etc.) or separator 115, may be formed as a tape that includes both a dielectric layer (e.g., plastic, polyester, polyethylene, polypropylene, fluorinated ethylene propylene, polytetrafluoroethylene, polyimide, or some other polymer or dielectric material that does not ordinarily conduct electricity etc.) and an electrically conductive layer (e.g., copper, aluminum, silver, an alloy, etc.). As one example, a separate dielectric layer and electrically conductive layer may be bonded, adhered, or otherwise joined (e.g., glued, etc.) together to form the shielding element. In other embodiments, electrically conductive material may be formed on a dielectric layer via any number of suitable techniques, such as the application of metallic ink or paint, liquid metal deposition, vapor deposition, welding, heat fusion, adherence of patches to the dielectric, etching of patches from a metallic sheet, or selective laser removal of metallic material to form patches. In certain embodiments, the conductive patches can be over-coated with an electrically insulating film, such as a polyester coating. Additionally, in certain embodiments, an electrically conductive layer may be sandwiched between two dielectric layers. In other embodiments, at least two electrically conductive layers may be combined with any number of suitable dielectric layers to form the shielding element. Indeed, any number of suitable layers of material may be utilized to form a tape which may be used as a shielding element.

As set forth above, a shielding element may include any number of patches of electrically conductive material. For example, a single electrically conductive patch may form a relatively continuous shield along a longitudinal length of a shielding element. Alternatively, a plurality of electrically conductive patches may be provided that are electrically isolated from one another to form a discontinuous shield. The electrical isolation may result from gaps or spaces between electrically conductive patches, such as gaps of dielectric material and/or air gaps (e.g., gaps between adjacent separator segments, etc.). The respective physical separations between the patches may impede the flow of electricity between adjacent patches.

The electrically conductive patches or sections may also include a wide variety of suitable dimensions, for example, any suitable lengths in the longitudinal direction, any suitable gap lengths or spaces between adjacent patches, and/or any suitable thicknesses. Additionally, a plurality of patches may be formed in accordance with a pattern or in random fashion. As desired, the dimensions can be selected to provide electromagnetic shielding over a specific band of electromagnetic frequencies or above or below a designated frequency threshold. In certain embodiments, each patch may have a length of about one meter to about ten meters or greater (e.g., a length of up to 100 meters, etc.), although lengths of less than one meter (e.g., lengths of about 1.5 to about 2 inches, etc.) may be utilized. For example, the patches may have a length in a range of about one to ten meters and isolation spaces in a range of about one to five millimeters. In various embodiments, the patches may have a length of about 0.5, 0.75, 1.0, 1.5, 2.0, 2.5, 3.0, 3.5, 4.0, 4.5, or 5.0 meters or in a range between any two of these values; and the isolation spaces can have a length of about 0.5, 1.0, 1.5, 2.0, 2.5, 3.0, 3.5, or 4 millimeters or in a range between any two of these values. For example, the patches may be between approximately two and approximately five meters in length or between approximately one and approximately three meters in length with a relatively small isolation gap. Additionally, in certain embodiments, the patches may be formed as first patches (e.g., first patches on a first side of a dielectric material), and second patches may be formed on an opposite side of the dielectric material (or on another dielectric material). For example, second patches may be formed to correspond with the gaps or isolation spaces between the first patches.

In certain embodiments, a dielectric portion of a tape (e.g., a tape that is formed into a desired shape to form a separator 115, a tape used to form a shield layer, etc.) may have a thickness of about 1 to about 5 mils (thousandths of an inch) or about 25 to about 125 microns. In the event that a non-tape separator is utilized, a dielectric portion or base portion of the separator may have any suitable dimensions, such as any suitable thickness, diameter, or circumference. Each electrically conductive patch may include a coating of metal having any desired thickness, such as a thickness of about 0.5 mils (about 13 microns) or greater. In many applications, signal performance benefits from a thickness that is greater than about 2 mils, for example in a range of about 2.0 to about 2.5 mils, about 2.0 to about 2.25 mils, about 2.25 to about 2.5 mils, about 2.5 to about 3.0 mils, or about 2.0 to about 3.0 mils. Indeed, with a thickness of less than about 1.5 mils, negative insertion loss characteristics may be present on the cable 100. In other embodiments, thicker portions of electrically conductive material may be utilized. For example, relatively solid portions of electrically conductive material may be positioned between dielectric ends to form a separator. A wide variety of other configurations including different thicknesses will also be appreciated.

In certain embodiments, the electrically conductive patches incorporated into a shielding element may have a spiral direction that is opposite the twist direction of the pairs 105. For example, the cable core and the four twisted pairs 105 may be collectively twisted about a longitudinal axis of the cable 100 in a common direction. The twist direction of the pairs 105 may be opposite the spiral direction of the patches. That is, if the core is twisted in a clockwise direction, then the patches may spiral in a counterclockwise direction. If the core is twisted in a counterclockwise direction, then the conductive patches may spiral in a clockwise direction. Thus, cable lay opposes the direction of the patch spiral. The opposite directions may provide an enhanced level of shielding performance. In other embodiments, the patches may have a spiral direction that is the same as the twist direction of the pairs 105. In yet other embodiments, different shielding elements may utilize different patch configurations and/or spiral directions.

According to an aspect of the disclosure, a dielectric separator or demarcator may be positioned between the individual conductive elements or electrical conductors of one or more of the twisted pairs 105. As shown in FIG. 1, a respective dielectric separator is positioned between the individual conductors of each of the twisted pairs 105. For example, a first dielectric separator 130A is positioned between the conductors of the first twisted pair 105A, a second dielectric separator 130B is positioned between the conductors of the second twisted pair 105B, a third dielectric separator 130C is positioned between the conductors of the third twisted pair 105C, and a fourth dielectric separator 130D is positioned between the conductors of the fourth twisted pair 105D. In other embodiments, only a portion of the twisted pairs 105 may include a dielectric separator positioned between the individual conductors.

In certain embodiments, a dielectric separator (generally referred to as dielectric separator 130) may be woven helically between the individual conductors or conductive elements of a twisted pair (generally referred to as twisted pair 105). In other words, the dielectric separator 130 may be helically twisted with the conductors of the twisted pair 105 along a longitudinal length of the cable 100. According to an aspect of the disclosure, the dielectric separator 130 may maintain spacing between the individual conductors of the twisted pair 105 and/or maintain the positions of one or both of the individual conductors. For example, the dielectric separator 130 may be formed with a cross-section that assists in maintaining the position(s) of one or both the individual conductors of the twisted pair 105. In other words, the dielectric separator 130 may reduce or limit the ability of one or both of the individual conductors to shift, slide, or otherwise move in the event that certain forces, such as compressive forces, are exerted on the cable 100.

A dielectric separator 130 may be formed with a wide variety of suitable shapes and/or dimensions. In certain embodiments, the dielectric separator 130 may include a lengthwise direction or length dimension that extends along the longitudinal length of the cable 100. Additionally, a cross-section of the dielectric separator 130 taken at a point along the lengthwise direction of the separator 130 may include a wide variety of suitable shapes and/or dimensions. In certain embodiments, the dielectric separator 130 may be formed such that a cross-section includes at least a first portion and a second portion, with the first portion and the second portion being angled with respect to one another. For example, a first portion may be positioned between the two conductors of the twisted pair. One or more additional portions (e.g., a second portion, a third portion, etc.) may extend at respective angles from the first portion. As another example, a first portion and a second portion may be positioned at an angle to one another, and at least one of the first portion or the second portion may be at least partially positioned between the two conductors of the twisted pair. In addition to a first and second portion, other portions may be added as desired in various embodiments. For example, a second portion may be positioned at an angle to a first portion, and a third portion may extend at another angle from the second portion.

As shown in FIG. 1, a dielectric separator 130 may be formed with a cross-section having an H-shape or an approximate H-shape. For example, the dielectric separator 130 may include a first portion positioned between the two conductors of a twisted pair 105. Both a second portion and a third portion may intersect the first portion. For example, a second portion may be positioned at one end of the first portion at an approximately ninety degree angle, and a third portion may be positioned at an opposite end of the first portion at an approximately ninety degree angle. Thus, the first portion may function as the middle of an "H" while the second and third portions function as the sides of the "H". Additionally, the individual conductors of the twisted pair 105 may be respectively positioned in the top and bottom spaces formed by the "H" shape. In other words, the top portion of the "H" may serve as a first cavity or chamber in which a first conductor may be positioned, and the bottom portion of the "H" may serve as a second cavity or chamber in which a second conductor may be positioned. The positioning of the conductors in these cavities may assist in maintaining the alignments, orientations, and/or positions of the conductors when forces are exerted on the cable 100.

Although a separator having an H-shape is illustrated in FIG. 1, a wide variety of other cross-sectional shapes may be utilized as desired in various embodiments. For example, a dielectric separator may be formed with a T-shape, a modified H-shape (e.g., an H-shape in which one side of the "H" is shorter than the other side, an X-shape, a modified X-shape, an E-shape, a Z-shape, an S-shape, a K-shape, or any other suitable cross-sectional shape. A few non-limiting examples of suitable cross-sectional shapes are described in greater detail below with reference to FIGS. 5A-5M. A wide variety of other variations may be utilized in other embodiments. Additionally, although each of the twisted pairs 105 shown in FIG. 1 is illustrated as having an H-shaped separator, in certain embodiments, different types of separators (e.g., separators having different cross-sections, etc.) may be utilized for at least two of the twisted pairs in a cable.

In certain embodiments, a cross-section of a dielectric separator 130 may form at least one cavity in which one or both of the insulated conductors of a twisted pair 105 is situated or positioned. For example, in certain embodiments, a dielectric separator 130 may form a cavity in which one of the conductors is positioned. In other embodiments, a dielectric separator 130 may form a respective cavity for each of the conductors. For example, the H-shaped separator illustrated in FIG. 1 may provide a respective cavity for each of the conductors. In certain embodiments, a cavity may be formed as a result of the separator 130 including a plurality of portions with at least two portions positioned at an angle to one another. For example, an H-shaped separator may include a plurality of angled portions (e.g., a first portion positioned between the conductors, a second portion positioned at one end of the first portion, and a third portion positioned at the other end of the first portion) that function to form two cavities in which the conductors may be situated. As another example, an S-shaped separator may include two curved portions that form individual cavities in which the conductors of a twisted pair 105 may be positioned. Other separator configurations may include any number of cross-sectional portions that form one or more cavities in which conductors may be positioned.

In certain embodiments, a cavity formed by a separator 130 may run along or near at least two sides of a conductor. For example, if a rectangle is formed around a conductor, the separator 130 may run along or near at least two sides of the rectangle. In certain embodiments, the cavity formed by a separator 130 may run along three sides of a conductor. For example, the H-shaped separators 130A-D illustrated in FIG. 1 may include cavities that run along three sides of a conductor. Additionally, in certain embodiments, one or more portions of a separator 130 that run along a conductor side may extend tangentially to the conductor. In other embodiments, one or more portions of a separator 130 may follow a path (e.g., a curved path) that conforms to an outer periphery of a conductor. In yet other embodiments, one or more portions of a separator 130 may be curved such that the portions partially conform to an outer periphery of a conductor.

As a result of providing one or more cavities into which one or more corresponding conductors of a twisted pair 105 may be positioned or situated, a dielectric separator 130 may assist in maintaining the alignments, orientations, and/or positions of the conductors when forces are exerted on the cable 100. For example, when mechanical stresses and/or compressive forces are applied to the cable 100 (e.g., stresses during shipment of the cable, stresses during cable installation, environmental forces, etc.), the dielectric separator 130 may assist in holding the conductors in place. As a result, shifting, sliding, and/or other movement of the various conductors incorporated into the cable 100 may be reduced or limited. In certain embodiments, the cable 100 may maintain relatively consistent conductor separation dimensions along its longitudinal length. As a result, the cable 100 may exhibit improved performance and/or reduced signal degradation relative to conventional twisted pair cables. These improvements may be greater and/or more noticeable at relatively higher signal frequencies, such as frequencies greater than approximately 650 Megahertz (MHz) or frequencies between approximately 650 MHz and approximately 2000 MHz.

At a given cross-section of a dielectric separator 130, each of the portions of the separator 130 may have any suitable dimensions (e.g., widths, lengths, thicknesses, etc.) as desired. For example, at least one separator portion may have a length (i.e., a measured length taken along the longest edge at a given cross-section of the separator) that is greater than or equal to one half the diameter of an insulated conductor of a twisted pair 105. In certain embodiments, a plurality of separator portions (e.g., a first portion, a second portion, etc.) may have a length that is greater than or equal to one half the diameter of an insulated conductor. As an example, if an individual conductor of the twisted pair has a diameter (e.g., a combined diameter of the conductor and insulation) of approximately 0.04 inches, then one or more separator portions may have a length that is at least approximately 0.02 inches.

In certain embodiments, at least one separator portion may have a length that is approximately equal to, greater than, and/or substantially greater than the diameter of an insulated conductor. As a result of having a relatively longer length, a separator portion may assist in maintaining the position of one or more conductors of a twisted pair 105. For example, each of the portions of the H-shaped separators illustrated in FIG. 1 has a length that is greater than the diameter of an insulated conductor, resulting in the formation of or cavities or chambers that assist in maintaining the positions of the conductors. In various embodiments, a separator portion may have a length that is approximately equal to one half the diameter of an insulated conductor, a length that is approximately equal to three quarters the diameter of an insulated conductor, a length that is approximately equal to the diameter of an insulated conductor, a length that is approximately 110%, 125%, 150%, 175%, or 200% the diameter of an insulated conductor, a length falling in a range between any two of the previously mentioned values, and/or any other suitable length.

In certain embodiments, at least one separator portion may have a length that results in the separator portion extending beyond its associated twisted pair 105. Along a longitudinal length of the cable 100, the twisted pair 105 may occupy an area having an approximately circular cross-section. At any given cross-sectional point, the individual conductors of the twisted pair 105 do not occupy an area having an overall circular cross-section; however, the twisting of the conductors along the longitudinal length results in the occupation of an approximately circular cross-sectional area. In certain embodiments, one or more separator portions may extend beyond an outer periphery or outer circumference taken up by the twisted pair 105. In other words, the dielectric separator 130 may extend beyond the cross-sectional area occupied by the twisted pair 105. In this regard, the dielectric separator 130 may function as a buffer that maintains separation between the twisted pair 105 and one or more other components of the cable 100, such as one or more shielding elements (e.g., a shield layer, a separator 115, etc.). In certain embodiments, a dielectric separator 130 may include one or more portions that extend beyond a twisted pair 105 along approximately the entire length of the dielectric separator 130. In other embodiments, a dielectric separator 130 may extend beyond a twisted pair 105 along portions of a longitudinal length of the separator, such as evenly spaced segments that extend beyond the twisted pair 105. Additionally, as desired in various embodiments, an extending portion of a dielectric separator 130 may include a curved, folded, angled or otherwise shaped end portion designed to engage another component of the cable 100. For example, an extending portion of the dielectric separator 130 may include an L-shaped, T-shaped, or other suitable end portion designed to engage a shielding element (e.g., a shield, a separator, etc.) and assist in maintaining a suitable separation between the twisted pair 105 and the shielding element.

Additionally, in certain embodiments, the separator portions may be relatively straight. In other embodiments (e.g., an S-shaped separator, etc.), at least one of the separator portions may be curved or may include a curved portion. In yet other embodiments, a separator 130 may include a plurality of straight and curved portions. In yet other embodiments, a separator portion may include one or more straight sides and one or more curved sides. A few example dimensions for an H-shaped dielectric separator are discussed in greater detail below with reference to FIG. 4A. Other separator designs may include certain dimensions that are similar to those described with reference to FIG. 4A. However, it will be appreciated that the described dimensions are provided by way of example only. Other suitable dimensions may be utilized as desired in various embodiments.

A dielectric separator 130 may be formed from a wide variety of suitable materials and/or combinations of materials. For example, the dielectric separator 130 can include paper metals (e.g., copper, steel, aluminum, etc.), alloys, various plastics, one or more polymeric materials, one or more polyolefins (e.g., polyethylene, polypropylene, etc.), one or more fluoropolymers (e.g., fluorinated ethylene propylene ("FEP"), melt processable fluoropolymers, MFA, PFA, ethylene tetrafluoroethylene ("ETFE"), ethylene chlorotrifluoroethylene ("ECTFE"), etc.), one or more polyesters, polyvinyl chloride ("PVC"), one or more flame retardant olefins (e.g., flame retardant polyethylene ("FRPE"), flame retardant polypropylene ("FRPP"), a low smoke zero halogen ("LSZH") material, etc.), polyurethane, neoprene, cholorosulphonated polyethylene, flame retardant PVC, low temperature oil resistant PVC, flame retardant polyurethane, flexible PVC, glass fibers, one or more composite materials, one or more relatively nonconductive nanomaterials, or any other suitable material or combination of materials. As desired, the dielectric separator 130 may be solid, filled, unfilled, foamed, un-foamed, homogeneous, or inhomogeneous and may or may not include additives (e.g., flame retardant and/or smoke suppressant materials).

In certain embodiments, each of the dielectric separators incorporated into a cable 100 (e.g., dielectric separators 130A-D illustrated in FIG. 1, etc.) may be formed from similar materials. In other embodiments, at least two of the dielectric separators may be formed from different materials. For example, a first dielectric separator, such as separator 130A, may be formed to include flame retardant materials while a second dielectric separator, such as separator 130B, is not formed to include flame retardant materials. Other material distributions may be utilized as desired in other embodiments.

A wide variety of suitable techniques may be utilized to form a dielectric separator 130. For example, a dielectric separator 130 may be extruded, poltruded, or otherwise formed into an appropriate shape. As another example, a dielectric separator 130 may be formed via a suitable foaming technique, such as an extrusion technique in which a foaming agent is introduced. As yet another example, a dielectric separator 130 may be formed from a tape (e.g., a malleable tape, etc.) that is folded or formed into a desired shape. For example, a tape may be passed through one or more dies in order to form a desired cross-sectional shape (e.g., an H-shape, an X-shape, etc.). As yet another example, a dielectric separator 130 may be formed by adhering or otherwise joining a plurality of individual portions together.

Additionally, in certain embodiments, a dielectric separator 130 may be formed to have a relatively uniform construction. In other embodiments, a dielectric separator 130 may be formed to include a plurality of layers. For example, a dielectric separator 130 may include a base layer (e.g., an extruded base layer, a dielectric base layer for a tape, etc.) and one or more additional materials may be added to the base layer. As one example, additional materials (e.g., electrically conductive materials, water blocking materials, etc.) may be formed on a base layer (e.g., an extruded base layer, a dielectric tape, etc.). As another example, additional materials (e.g., electrically conductive material, strength members, water blocking materials, etc.) may be embedded within a base layer. As yet another example, a base layer may be impregnated with one or more additional materials.

A wide variety of additional features and/or components may be incorporated into dielectric separators 130 as desired in various embodiments. In certain embodiments, electrically conductive material may be incorporated into a dielectric separator 130. For example, a tape containing electrically conductive material may be embedded in a dielectric separator 130. As another example, a dielectric separator 130 may be impregnated with electrically conductive material or patches of electrically conductive material may be embedded within a dielectric separator 130. In other embodiments, one or more strength members (e.g., strength yarns, strength rods, etc.) may be incorporated into a dielectric separator 130. In yet other embodiments, water absorbing material, flame retardant material, smoke suppressants, and/or other suitable components and/or materials may be incorporated into a dielectric separator 130. Additionally, in certain embodiments, one or more transmission media may be embedded or otherwise incorporated into a dielectric separator 130. For example, one or more optical fibers may be embedded in a dielectric separator 130 or positioned in one or more longitudinal cavities formed in the dielectric separator 130. A few non-limiting examples of additional features that may be incorporated into a dielectric separator 130 are discussed in greater detail below with reference to FIGS. 4A-4E.

Additionally, as desired in certain embodiments, a dielectric separator 130 may be subjected to one or more processes and/or formation techniques that increase the flexibility of the dielectric separator 130 and/or assist a technician in breaking the separator during installation of a cable 100. For example, as discussed in greater detail below with reference to FIG. 6B, a dielectric separator 130 may be scored or partially serrated at one or more positions (e.g., at regular intervals, etc.) along the longitudinal length of the separator 130. As another example, as discussed in greater detail below with reference to FIG. 6C, one or more notches may be formed in the separator 130 at one or more positions along a longitudinal length of the separator 130.

As yet another example, in certain embodiments, a dielectric separator 130 may be severed into a plurality of discrete segments or formed as a plurality of discrete segments that are positioned end to end along a longitudinal length of the cable 100. In other words, a dielectric separator may be formed as a discontinuous separator with a plurality of sections. The various segments of the separator 130 may include a wide variety of different lengths and/or sizes. In certain embodiments, each of the segments may have lengths that are approximately equal. In other embodiments, different segments may have varying lengths. These varying lengths may follow an established pattern or, alternatively, may be random. In certain embodiments, gaps or spaces may be present in the longitudinal direction of the cable 100 between two consecutive or adjacent segments of the separator 130. In other embodiments, adjacent portions of the separator 130 may be permitted to contact one another. In yet other embodiments, gaps may be present between some adjacent segments while other adjacent portions are permitted to contact one another. Additionally, a wide variety of suitable gap sizes may be utilized as desired in various embodiments, and the gap sizes may be approximately equal, varied in accordance with any desired pattern, or varied at random. In certain embodiments, the gaps may be small enough to prevent the conductors of a twisted pair 105 from contacting each other in the interstitial spaces between segments of the separator 130. In certain embodiments, each segment of a discontinuous dielectric separator 130 may be formed from similar materials. In other embodiments, a separator 130 may make use of alternating materials in adjacent portions (whether or not a gap is formed between adjacent portions). For example, a first segment of the separator 130 may be formed from a first set of one or more materials, and a second portion or segment of the separator 130 may be formed from a second set of one or more materials.

In certain embodiments, a suitable adhesive may be deposited or formed on the dielectric separator 130 in order to bond one or both of the conductors of a twisted pair 105 and the dielectric separator 130. For example, a pressure sensitive adhesive (e.g., glue, etc.) or a hot melt adhesive (e.g., a thermoplastic, an elastomer, an elastomeric material, a thermoplastic elastomer, synthetic rubber, latex rubber, silicone rubber, silicone polyurethane, silicone, acrylic rubber, etc.) may be applied to the dielectric separator 130 during assembly of a twisted pair 105, and the conductor(s) of the twisted pair 105 may be brought into contact with the adhesive. In certain embodiments, the adhesive may be applied in-line as a twisted pair 105 is assembled. In certain embodiments, the adhesive may hold the twisted pair components in place during construction of the cable 100 (e.g., prior to formation of the outer jacket 115), during storage, shipment, and installation of the cable 100 (e.g., as the cable 100 is drawn through a duct, etc.), and/or following installation of the cable 100 (e.g., as mechanical stress is exerted on a buried cable, etc.).

A wide variety of suitable techniques may be utilized as desired to incorporate a dielectric separator 130 into a cable 100. For example, a dielectric separator 130 and two electrical conductors may be fed from spools, bins, and/or reels. The dielectric separator 130 may be positioned adjacent to the two conductors. For example, the dielectric separator 130 may be positioned between the two conductors such that one or both of the conductors are situated within one or more corresponding cavities of the separator 130. In certain embodiments, the dielectric separator 130 may be continuously fed. As desired, the dielectric separator 130 may be selectively scored, notched, or severed as it is fed. In other embodiments, the dielectric separator 130 may be scored or notched prior to feeding. In yet other embodiments, precut segments of a dielectric separator 130 may be fed from one or more sources. Additionally, as desired in certain embodiments, a suitable adhesive or bonding material (e.g., pressure sensitive adhesive, hot melt adhesive, glue, etc.) may be applied to one or more conductors and/or to the separator 130 prior to the separator 130 and the two conductors being positioned adjacent to one another. The dielectric separator 130 and the two conductors may then be twisted together. As a result, the dielectric separator 130 may be woven helically into a twisted pair 105. The resulting twisted pair 105 may then be combined with a wide variety of other cable components, such as other twisted pairs, shielding components, a separator positioned between two or more twisted pairs, etc. An outer jacket may then be extruded over the cable components. Other suitable techniques may be utilized, and the techniques described above are provided by way of non-limiting example only.

As a result of providing dielectric separators 130 or separation elements between the conductors of one or more twisted pairs 105, a relatively consistent conductor separation may be maintained along a longitudinal length of a cable 100. Additionally, one or more cavities formed by the dielectric separators 130 may assist in maintaining the position(s) of one or more conductors when stresses are applied to the cable 100. As a result, shifting, sliding, and/or other movement of the various conductors incorporated into the cable 100 may be reduced or limited. Additionally, the cable may exhibit improved electrically performance and/or lower losses due to crosstalk (e.g., near end crosstalk, far end crosstalk, etc.) relative to conventional twisted pair cables.

As desired in various embodiments, a wide variety of other materials may be incorporated into the cable 100. For example, as set forth above, the cable 100 may include any number of conductors, twisted pairs, optical fibers, and/or other transmission media. In certain embodiments, one or more tubes or other structures may be situated around various transmission media and/or groups of transmission media. Additionally, as desired, a cable may include a wide variety of strength members, swellable materials (e.g., aramid yarns, blown swellable fibers, etc.), insulating materials, dielectric materials, flame retardants, flame suppressants or extinguishants, gels, and/or other materials.

The cable 100 illustrated in FIG. 1 is provided by way of example only. Embodiments of the disclosure contemplate a wide variety of other cables and cable constructions. These other cables may include more or less components than the cable 100 illustrated in FIG. 1. Additionally, certain components may have different dimensions and/or materials than the components illustrated in FIG. 1.

Figure 2:
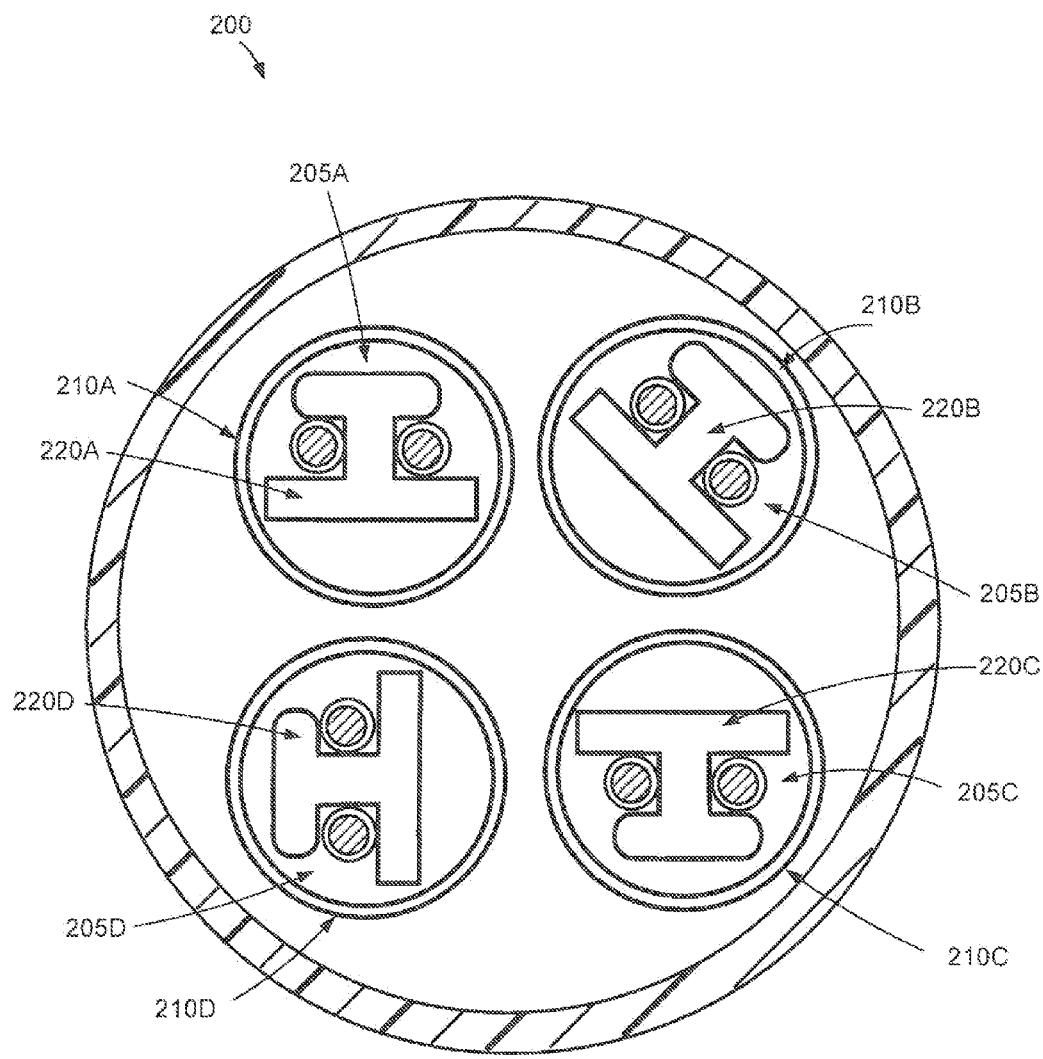

FIG. 2 is a cross-sectional view of another example twisted pair communication cable 200, according to an illustrative embodiment of the disclosure. The cable 200 of FIG. 2 may include certain components that are similar to the cable 100 illustrated and described above with reference to FIG. 1. Accordingly, the cable 200 may include a plurality of twisted pairs 205A-D disposed in a cable core. Additionally, each of the twisted pairs 205A-D may be individually shielded. For example, respective shield layers 210A-D may be formed around each of the twisted pairs 205A-D. An outer jacket 215 may enclose the internal components of the cable 200.

In contrast to the cable 100 illustrated in FIG. 1, the cable 200 of FIG. 2 does not include either a separator or an external shield. Additionally, each of the dielectric separators 220A-D positioned between the individual conductors of the respective twisted pairs 205A-D have cross-sections that differ from the dielectric separators 130A-D illustrated in FIG. 1. While the dielectric separators 130A-D of FIG. 1 have an approximately H-shaped cross-section, the separators 220A-D illustrated in FIG. 2 have a modified T-shaped cross-section. Each separator (generally referred to as separator 220) has a cross-section that includes a first portion positioned between the two conductors of a twisted pair (generally referred to as twisted pair 205). Further, a second portion is positioned at one end of the first portion at an approximately ninety degree angle such that the first and second portions form a T-shape. A third portion may then be positioned at an opposite end of the first portion at an approximately ninety degree angle. However, the third portion has a relatively shorter length than the second portion. For example, a length that the third portion extends in either direction from the first portion may be less than or approximately equal to the diameter of a conductor (e.g., approximately one third the diameter, approximately one half the diameter, etc.). The conductors of the twisted pair 205 may then be positioned in the respective cavities formed by the separator 220 on either side of the first portion between the second and third portions.

Figure 3:
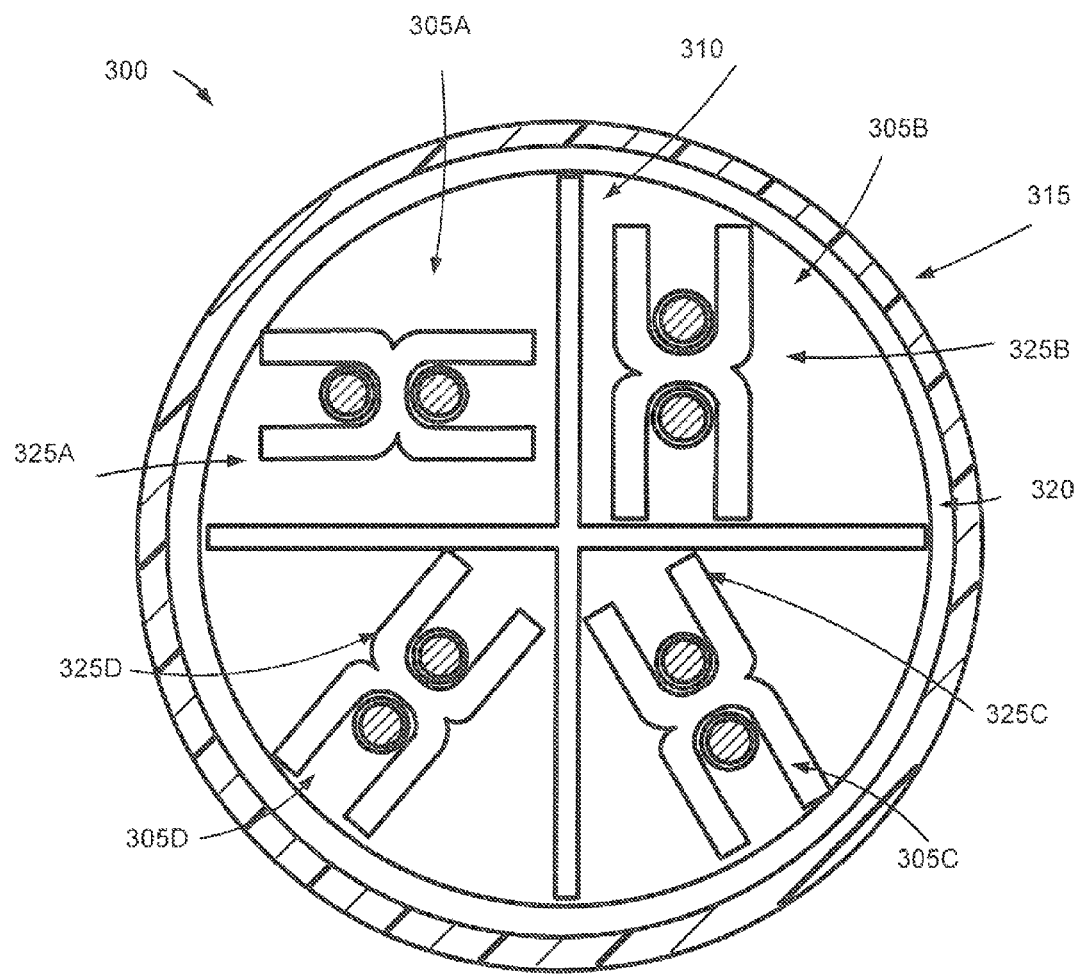

FIG. 3 is a cross-sectional view of another example twisted pair communication cable 300, according to an illustrative embodiment of the disclosure. The cable 300 of FIG. 3 may include certain components that are similar to the cable 100 illustrated and described above with reference to FIG. 1. Accordingly, the cable 300 may include a plurality of twisted pairs 305A-D disposed in a cable core. A separator 310 may be disposed between at least two of the twisted pairs 305A-D and may function to orient and/or provide desired spacing between two or more of the twisted pairs 305A-D. Additionally, an external shield 315 may be formed around the twisted pairs 305A-D and the separator 310. An outer jacket 320 may enclose the internal components of the cable 300.

In contrast to the cable 100 of FIG. 1, individual shield layers are not provided for each of the twisted pairs 305A-D of the cable 300 in FIG. 3. Further, each of the dielectric separators 325A-D positioned between the individual conductors of the respective twisted pairs 305A-D have cross-sections that differ from the dielectric separators 130A-D illustrated in FIG. 1. While the dielectric separators 130A-D of FIG. 1 have approximately H-shaped cross-sections, the separators 325A-D illustrated in FIG. 3 have approximately X-shaped cross-sections. Each separator (generally referred to as separator 325) has a cross-section that includes a first portion and a second portion that are positioned at an angle to one another. For example, the portions may interest between the two conductors. A first portion may extend along one side (e.g., a left side) of a first conductor, intersect the second portion, and then extend along an opposite side (e.g., a right side) of the second conductor. Similarly, a second portion may extend along one side (e.g., a right side) of a first conductor, intersect the first portion, and then extend along an opposite side (e.g., a left side) of the second conductor. The intersecting portions may further define respective cavities (e.g., a top cavity of the "X", a bottom cavity of the "X", etc.) in which the conductors may be positioned.

Although the X-shaped cross-section is described in the example above as including a first portion and a second portion (e.g., two portions that include curved elements) that interest between the two conductors, the X-shaped cross-section maybe formed utilizing any configuration of portions. For example, the X-shaped cross-section may be viewed as including two approximately V-shaped or two approximately U-shaped portions positioned adjacent to one another such that they intersect between the two conductors. As another example, the X-shaped cross-section may be viewed as including four portions that extend in different directions from a central point between the two conductors. A wide variety of other suitable configurations will be appreciated.

Similar to the cable 100 illustrated in FIG. 1, the cables 200, 300 illustrated in FIGS. 2-3 are provided by way of example only. Embodiments of the disclosure contemplate a wide variety of other cables and cable constructions. These other cables may include more or less components than the cables 200, 300 illustrated in FIGS. 2-3. For example, other cables may include alternative shielding arrangements and/or different types of twisted pair separators. Other cables may also include alternative numbers and/or configurations of dielectric separators positioned between the conductors of one or more twisted pairs. Additionally, certain components may have different dimensions and/or materials than the components illustrated in FIGS. 2-3.

As set forth above, a dielectric separator, such as one of the dielectric separators 130 illustrated in FIG. 1, may include a wide variety of suitable dimensions and/or shapes. Additionally, with any given shape of a dielectric separator, a wide variety of permutations and/or additional features may be added as desired in various embodiments. FIGS. 4A-4E are cross-sectional views of example dielectric separators that may be utilized in conjunction with a twisted pair, according to illustrative embodiments of the disclosure. FIGS. 4A-4E illustrate various embodiments of H-shaped dielectric separators. Certain features and/or aspects of the separators illustrated in FIGS. 4A-4E may be applicable to dielectric separators having other cross-sectional shapes.

Turning first to FIG. 4A, a cross-sectional view of a first example dielectric separator 400 is illustrated. The H-shape of the separator 400 may be formed by positioning a first portion 405 between the two conductors 407A, 407B of a twisted pair with a second portion 410 situated at a first end of the first portion 405 and a third portion 415 situated at an opposite end of the first portion 405. Each the second portion 410 and the third portion 415 may be positioned at a respective angle relative to the first portion, such as a respective ninety degree angle. Two cavities 420A, 420B may be defined by the separator 400, and the conductors 407A, 407B may each be positioned within a respective cavity.

As desired, the dielectric separator 400 may have any suitable dimensions. For example, each of the cross-sectional portions of the dielectric separator may be formed with any suitable lengths, widths, and/or thicknesses. With reference to FIG. 4A, the first portion 405 may have a length 422 that is approximately equal to or greater than a diameter of the conductors 407A, 407B. In certain embodiments, the length 422 may be between approximately 0.017 inches and approximately 0.23 inches. Indeed, the length 422 may be any suitable length that corresponds to a desired length of a cavity in which a conductor 407A, 407B will be situated. Additionally, the first portion 405 may be formed with any desired thickness 424. In certain embodiments, the thickness 424 of the first portion 405 may define a separation distance between the two conductors 407A, 407B of a twisted pair. Examples of suitable separation distances or thicknesses include thicknesses between approximately 0.002 inches and approximately 0.020 inches; however, other thicknesses may be utilized as desired.

Each of the second portion 410 and third portion 415 (e.g., the side portions) may also include any suitable lengths and/or thicknesses. For example, the second portion 410 may have a length 426 that extends from the top of the first cavity 420A to the bottom of the second cavity 420B. Additionally, the length 426 of the second portion 410 may at least partially define a depth of each of the cavities 420A, 420B. In certain embodiments, the length 426 may be between approximately 0.05 inches and approximately 0.7 inches. In other embodiments, the length 426 may be between approximately one times the diameter of a conductor 407A and three time the diameter of the conductor 407A. Additionally, the length 426 may be sized to create any suitable cavity depth, such as a depth between approximately 0.001 inches and approximately 0.7 inches. As desired, the length 426 may be determined based at least in part on a desired separation between the conductors 407A, 407B and one or more other components of the cable 100. For example, the length 426 may be determined such that the second portion 410 extends beyond an outer periphery of a conductor 407A. In this regard, the second portion 410 may serve to create a separation distance between the conductor 407A and another component of a cable, such as a shielding element. Other lengths may be utilized as desired.

Additionally, the second portion 410 may have any suitable thickness 428. In certain embodiments, the thickness may be approximately equal to the length 422 of the first portion 405. In other embodiments, the thickness may be between approximately 0.05 inches and approximately 0.70 inches. As desired, the thickness 428 may be determined based at least in part on a desired separation between the conductors 407A, 407B and one or more other components of the cable 100 and/or based at least in part on a desired tensile strength of the separator 400. In certain embodiments, the third portion 415 may include dimensions similar to the second portion 410. In other embodiments, one or more dimensions may vary between the second portion 410 and the third portion 415. Additionally, the separator 400 may have a total width 430 that is equal to the sum of the length 422 of the first portion 405 and the thicknesses of the second and third portions 410, 415. Example distances for the total width 430 may include distances between approximately 0.05 inches and approximately 0.7 inches. However, other distances may be utilized as desired in various embodiments.

With the H-shaped separator 400 illustrated in FIG. 4A, the first portion 405 is positioned at approximately ninety degree angles with respect to the second portion 410 and the third portion 415. In other embodiments, various portions of a separator may be positioned at any suitable angle relative to one another. These angles may include acute angles, right angles, and/or obtuse angles.

As an alternative description of the separator 400 of FIG. 4A, the first portion 405 may have a length that spans an entire dimension (e.g., width, etc.) of the separator 400, such as a length approximately equal to the total width 430 discussed above. Four additional portions may then extend from the first portion to define the two cavities 420A, 420B in which the conductors 407A, 407B may be positioned. For example, at or near a first end of the first portion, a second portion may extend in a first direction (e.g., an upward direction) and a third portion may extend in a second direction (e.g., a downward direction). Similarly, at or near an opposite end of the first portion, a fourth portion may extend in the first direction and a fifth portion may extend in the second direction. Indeed, a separator may be viewed as including any suitable numbers of cross-sectional portions having any suitable dimensions.

With continued reference to FIG. 4A, in certain embodiments, one or more additional elements may be embedded or otherwise incorporated into the separator 400. For example, a suitable carrier layer 435 (e.g., a carrier tape, etc.) may be embedded in the separator 400 or positioned within a cavity, core, or channel formed through the separator 400 (e.g., formed through the separator 400 in a longitudinal direction). As shown, the carrier layer 435 is positioned approximately within the first portion 405 or approximately between the two conductors 407A, 407B. However, in other embodiments, a carrier layer 435 may be positioned in any other suitable location, such as within the second portion 410 or within the third portion 415. In yet other embodiments, multiple carrier layers (and/or other elements) may be embedded or incorporated into the separator 400.

The carrier layer 435 may include any suitable materials and/or combinations of materials as desired in various embodiments. For example, the carrier layer 435 may include electrically conductive material (e.g., metallic material, etc.) that provides a shielding function. The carrier layer 435 may be formed as relatively solid electrically conductive material or with a plurality of layers, such as layers of electrically conductive material or as a layer of electrically conductive material formed on a base layer (e.g., electrically conductive patches formed on a substrate, etc.). As another example, the carrier layer 435 may include one or more strength members, such as strength yarns, strength fibers, glass fibers, composite strength members, etc. As yet other examples, the carrier layer 435 may include water swellable materials (e.g., a water swellable tape, etc.), flame retardant materials, smoke suppressant materials, extinguishants, and/or any other suitable materials as desired. Additionally, although the carrier layer 435 is illustrated as being embedded or incorporated into the separator 400, in other embodiments, one or more additional elements may be adhered or formed on one or more external surfaces of the separator 400. For example, patches of electrically conductive material may be formed on one or more external surfaces of the separator 400.

With reference to FIG. 4B, a cross-sectional view of another example dielectric separator 440 is illustrated. The separator 440 shown in FIG. 4B may be similar to the separator 400 illustrated in FIG. 4A. However, one or more transmission media may be embedded or incorporated into the separator 440 of FIG. 4B. As shown, an optical fiber 445 may be embedded into the separator 440 or positioned within a cavity, channel, or core formed through the separator 440. Although a single optical fiber 445 is illustrated in FIG. 4B, a plurality of optical fibers may be incorporated into a separator as desired in various embodiments. Additionally, any suitable types of optical fibers may be incorporated, such as single mode fibers, multimode fibers, multicore fibers, etc. In yet other embodiments, other types of transmission media may be embedded or otherwise incorporated into the separator, such as drain wires, etc.

FIG. 4C illustrates a cross-sectional view of another example dielectric separator 450 that may be utilized in various embodiments. In contrast to the separator 400 illustrated in FIG. 4A, the cavities of the separator 450 of FIG. 4C may be shallower or have relatively smaller depths. In other words, the second and third portions of the separator 450 may not extend beyond an outer periphery of conductors positioned within the separator cavities. As a result, the separator 450 of FIG. 4C may be formed with less material than the separator 400 of FIG. 4A.

Turning to FIG. 4D, a cross-sectional view of another example dielectric separator 455 is illustrated. In contrast to the separators 400, 440, 450 illustrated in FIGS. 4A-4C, the separator 455 of FIG. 4D may be formed to at least partially conform to the curvature of one or more conductors. For example, one or more portions of the separator 455 may include one or more edges, such as edge 460, that correspond to the curvature of a conductor. In the event that a conductor is adhered or bonded to the separator 455, the curvature may result in improved adhesion or bonding. By contrast, with the separators 400, 440, 450 illustrated in FIGS. 4A-4C, one or more air gaps may exist between a conductor and an outer separator surface. Because air has a lower dielectric constant than the materials used to form the separators, the air gaps may result in improved electrical performance.

FIG. 4E illustrates a cross-sectional view of yet another example dielectric separator 465. The first portion of the separator 465 (e.g., the portion positioned between the two conductors) may include one or more projections 470 extending outwardly into the cavities in which the conductors are positioned. These projections 470 may be formed as extensions from the first portion and/or as indentions made in the first portion. Any number of projections 470 may be formed as desired in various embodiments. Additionally, the projections 470 may result in the formation of additional air gaps between the conductors and the separator 465, which may lead to improved electrical performance. As desired, similar projections and/or indentions may be provided in the second portion and/or the third portion of the separator 465. Indeed, a wide variety of indentions/projections may be utilized in order to achieve desired electrical performance characteristics.

The separators 400, 440, 450, 455, 465 illustrated in FIGS. 4A-4E are provided by way of non-limiting example only to illustrate a few permutations and/or additional features that may be incorporated into dielectric separators. Other separators, regardless of shape and/or dimensions, may include one or more of the features and/or elements described above with reference to FIGS. 4A-4E. These other separators may include more or less components than those illustrated FIGS. 4A-4E.

Figure 5A:
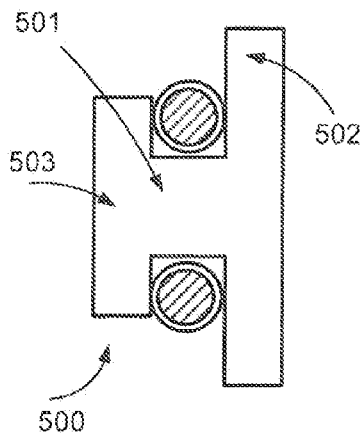
FIGS. 5A-5M are cross-sectional views of example dielectric separators that may be utilized in conjunction with a twisted pair, according to illustrative embodiments of the disclosure.

As set forth above, dielectric separators, such as the dielectric separators 130A-D illustrated in FIG. 1, may include any suitable cross-sectional shapes and/or dimensions. For example, the separators described above with reference to FIGS. 4A-4E have H-shaped or approximately H-shaped cross-sections. FIGS. 5A-5M illustrate other example cross-sectional shapes that may be utilized in association with dielectric separators. Turning first to FIG. 5A, a modified T-shape separator 500 is illustrated. The separator 500 may include a first portion 501 positioned between the two conductors. A second portion 502 may be positioned at an approximately ninety degree angle at a first end of the first portion 501. Additionally, a third portion 503 may be positioned at an approximately ninety degree angle at an opposite end of the first portion. As illustrated, the second portion 502 may be longer than the third portion 503. For example, the second portion 502 may extend beyond the conductors while the third portion 503 does not. In other embodiments, the second portion may have a length approximately equal to that illustrated for the third portion, resulting in an H-shaped separator in which the side portions of the "H" do not extend along a full length of the outer periphery of the conductors.

Figure 5B:
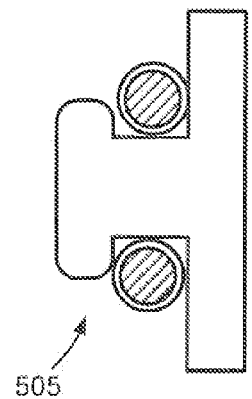
Figure 5C:
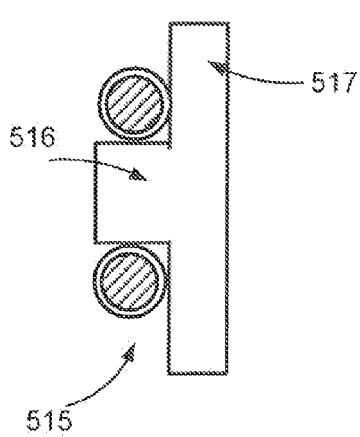

FIG. 5B illustrates another example modified T-shape separator 505. The separator 505 of FIG. 5B may include similar components to those described above for the separator 500 of FIG. 5A. However, one or more of the components may have rounded edges. FIG. 5C illustrates an example separator 515 having a T-shape. The separator 515 may be formed from two portions 516, 517 positioned at an angle (e.g., a ninety degree angle, etc.) relative to one another. Although the cavities formed by the separator 515 may be partial cavities, these cavities may assist in maintaining the positions of the conductors. Additionally, in certain embodiments, the conductors may be adhered or bonded to the separator 515.

Figure 5D:
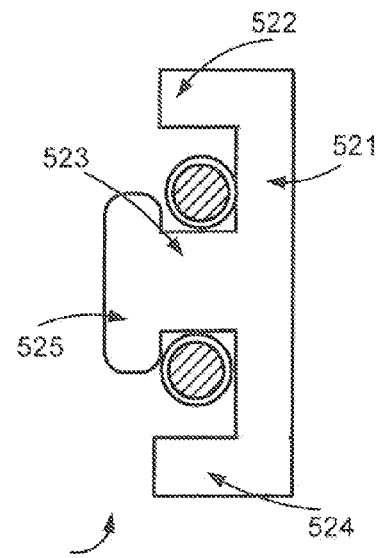

FIG. 5D illustrates an example separator 520 having an approximate E-shape or an approximate number "3" shape (e.g., a backwards "E"). As shown, the separator 520 may include a first portion 521 extending in a vertical direction along the sides of each of the conductors. Three additional portions 522, 523, 524 may extend from the first portion 521 at approximately ninety degree angles in order to form cavities in which the conductors may be positioned. Additionally, in certain embodiments, further portion(s) may be positioned at opposite ends of one or more of the additional portions. For example, one of the additional portions 523 may extend between the two conductors. A fifth portion 525 may be positioned at an end of the additional portion opposite the end that contacts the first portion. As shown, the fifth portion 525 may be positioned at a ninety degree angle relative to the additional portion 523, and the fifth portion 525 may assist in maintaining or holding the conductors in their respective cavities.

Figure 5E:
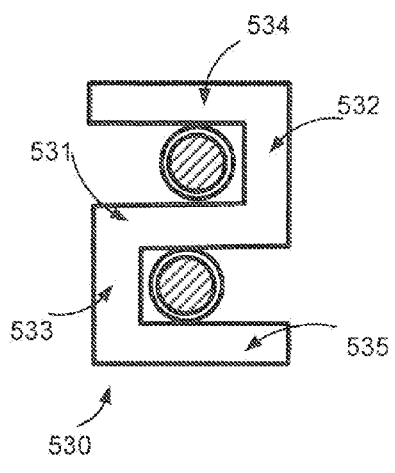
Figure 5F:
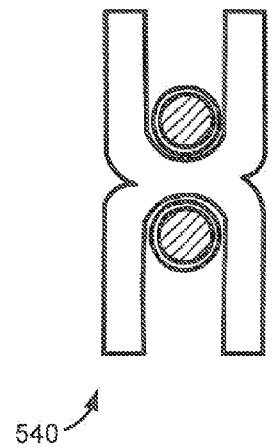
Figure 5G:
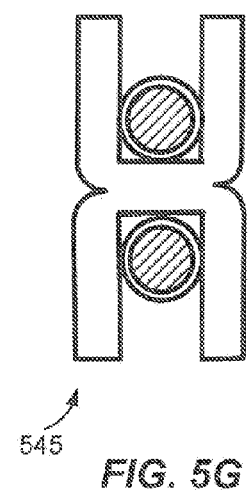

FIG. 5E illustrates an example separator 530 having a block "S" shape or a block number "2" shape. The separator 530 may include a first portion 531 positioned between the two conductors of a twisted pair. Second and third portions 532, 533 may extend in opposite directions from opposite ends of the first portion 531. Fourth and fifth portions 534, 535 may then respectively extend from opposite ends of the second and third portions 532, 533 in order to form cavities in which the conductors are positioned.

FIGS. 5F-5I illustrate example separators 540, 545, 550, 555 having approximate X-shapes. The separators 540, 545 illustrated in FIGS. 5F and 5G may have block X-shapes. These separators 540, 545 may be similar to H-shaped separators; however, indentions or cutouts may be formed on opposite sides of the separator in order to achieve an approximate X-shape. As a result, these separators 540, 545 may be formed with less material than similar H-shaped separators. Additionally, similar to the H-shaped separator 455 illustrated in FIG. 4D, the separator 540 illustrated in FIG. 5F may have rounded portions on one or more surfaces that contact the conductors. The separator 545 illustrated in FIG. 5G does not include this rounded portions.

Figure 5H:
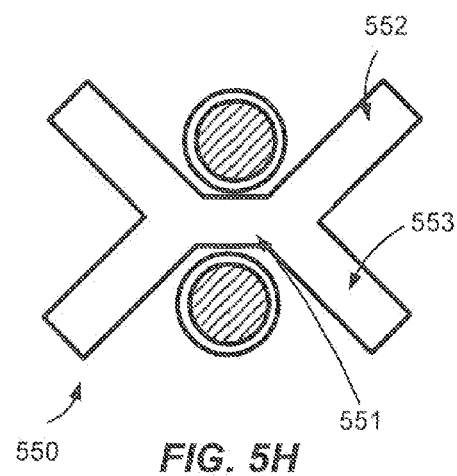

Turning now to FIG. 5H, an approximate X-shaped separator 550 having an elongated center portion 551 is illustrated. The center portion 551 may be positioned between the two conductors. At opposite ends of the center portion 551, a plurality of additional portions may extend in different directions. For example, at one end of the center portion 551, a second portion 552 may extend at an upward angle from the center portion 551. Any desired angle may be utilized as desired in various embodiments, such as an angle between approximately thirty degrees and approximately ninety degrees. Similarly, a third portion 553 may extend at a downward angle from the center portion 551. Corresponding fourth and fifth portions may extend at respective angles from an opposite end of the center portion 551 in order to define cavities in which the conductors may be situated.

Figure 5I:
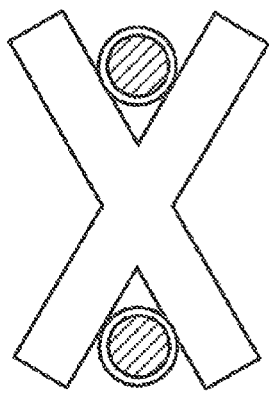

FIG. 5I illustrates an example X-shaped separator 555 in which two portions intersect at an angle in order to form an "X" shape. As shown, the intersection of the two portions may be positioned between the two conductors. Thus, there is no single portion positioned between the two conductors. Alternatively, the separator 55 of FIG. 5I may be viewed as two "V" shaped portions that are joined between the two conductors.

Figure 5J:
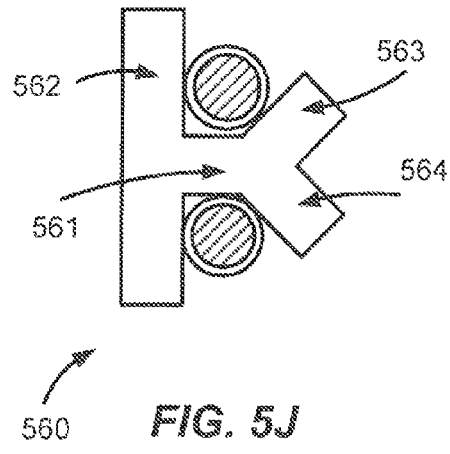
Figure 5K:
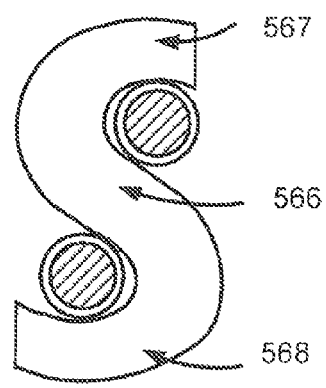

FIG. 5J illustrates an example K-shaped separator 560. With reference to FIG. 5K, a first portion 561 may be positioned between the two conductors of a twisted pair. A second portion 562 may be positioned at one end of the first portion 561 at a ninety degree angle, and the second portion 562 may extend in two directions from the first portion 561 along one side of each of the conductors. Third and fourth portions 563, 564 may then extend at respective upward and downward angles from an opposite end of the first portion 561. Any suitable angles may be utilized as desired, such as angles between approximately thirty degrees and approximately ninety degrees. In another example embodiment, the first portion 561 may be removed, and the third and fourth portions may extend at respective angles from the second portion to form a K-shaped separator.

FIG. 5K illustrates an example S-shaped or backwards S-shaped separator 565. The separator 565 may be viewed as having a first portion 566 that extends at an angle between the two conductors of a twisted pair. Curved second and third portions 567, 568 may then extend in opposite directions from opposing ends of the first portion 566 to form cavities in which the conductors are positioned. Alternatively, an S-shaped separator may be formed as a result of two approximately U-shaped portions intersecting between the conductors.

Figure 5L:
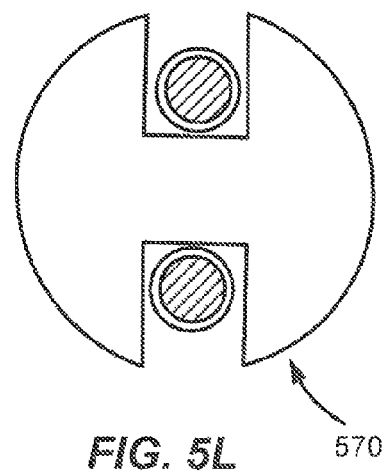
Figure 5M:
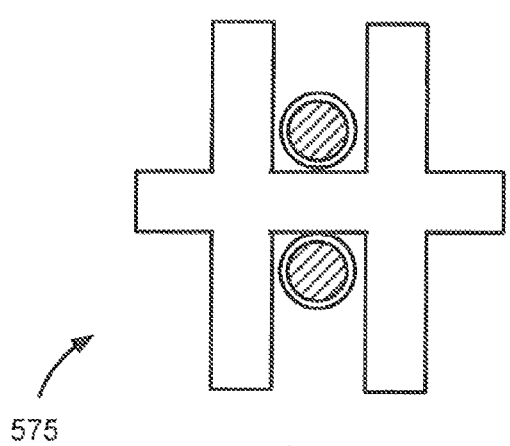

FIGS. 5L and 5M illustrate example separators 570, 575 that may both maintain the positioning of conductors as well as define separation distances between the conductors and other cable elements. For example, the separator 570 of FIG. 5L may include rounded side portions that may maintain a desired separation distance between the conductors of a twisted pair and an individual shield wrapped around the twisted pair. Similarly, the separator 575 of FIG. 5M may include extensions to either side (e.g., extensions from either side of an H-shape) in order to maintain a desired separation distance between the conductors and another cable element, such as an individual twisted pair shield. However, the separator 575 of FIG. 5M may utilize less material than the separator 570 of FIG. 5L. Additionally, the separator 575 of FIG. 5M may provide additional air pockets relative to the separator 570 of FIG. 5L. In other embodiments, cavities or channels may be formed in the separator 570 of FIG. 5L in order to provide air pockets. Indeed, a wide variety of separator designs may be utilized in order to maintain desired distances between the conductors and other cable elements in any number of cross-sectional directions.

The dielectric separators discussed above with reference to FIGS. 5A-5M are provided by way of non-limiting example only to illustrate a few example separator cross-sections that may be utilized in various embodiments. Other separators may include other shapes and/or dimensions as desired. Additionally, other separators may include more or less components than those illustrated in FIGS. 5A-5M.

Figure 6A:
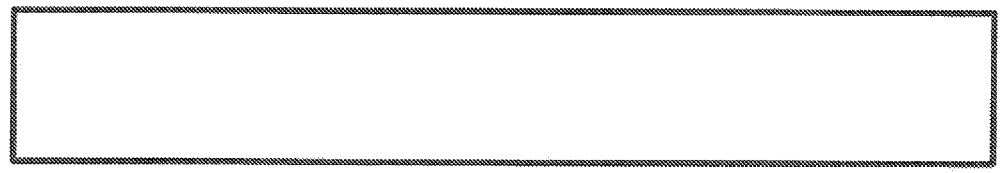
FIGS. 6A-6D are side views of example dielectric separators that may be utilized in conjunction with a twisted pair, according to illustrative embodiments of the disclosure.
Figure 6B:
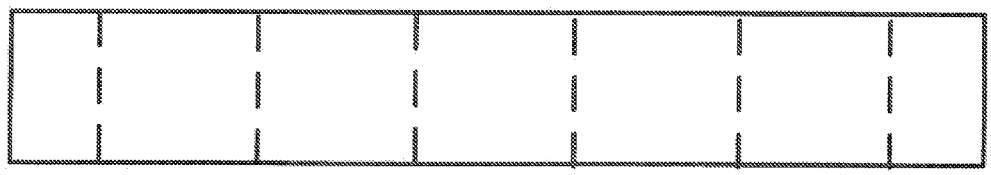
Figure 6C:
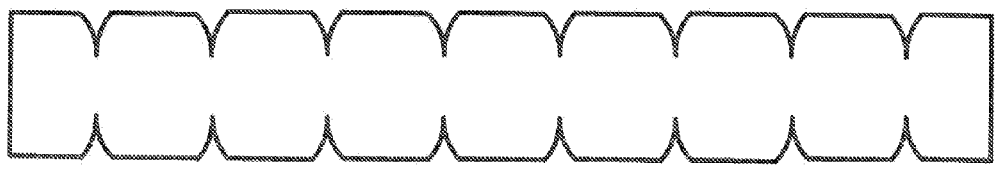

As desired in various embodiments, a dielectric separator may be subjected to one or more processes and/or formation techniques that increase the flexibility of the dielectric separator and/or assist a technician in breaking the separator during installation of a cable. FIGS. 6A-6D are side views of example dielectric separators 605, 610, 615, 620 that may be utilized in conjunction with a twisted pair, according to illustrative embodiments of the disclosure. The separator 605 of FIG. 6A is formed as a relatively continuous separator along a longitudinal direction as the separator 605 is incorporated into a cable. The separators 610, 615 of FIGS. 6A and 6B are also relatively continuous separators along a longitudinal direction or length. However, the separator 610 of FIG. 6B may be scored or partially serrated at any number of positions along its longitudinal length. For example, the separator 610 may be scored at regular intervals or at random along its longitudinal length. Additionally, any suitable distance may be present between adjacent scorings of the separator 610. For example, the separator 610 may be scored every six inches, every foot, every two feet, or at any other suitable intervals. Similarly, the separator 615 of FIG. 6C may include notches or partial cutout portions at any number of positions along its longitudinal length. For example, the separator 615 may include notches at regular intervals or at random. In other embodiments, a separator may include a combination of notching and scoring.

Figure 6D:
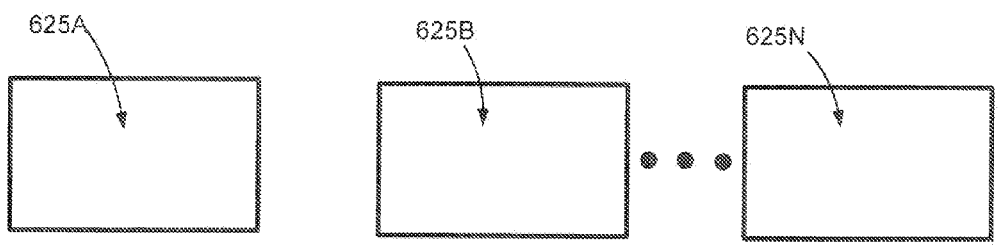

The separator 620 illustrated in FIG. 6D may be formed as a discontinuous separator that includes a plurality of discrete segments 625A-N arranged end to end along a longitudinal length of a cable. Any number of segments may be utilized to form a separator. Additionally, as discussed in greater detail above, the segments may have any suitable lengths and/or other dimensions. The segments may also be formed from any suitable materials and/or combinations of materials. Further, any suitable spaces, gaps, and/or other distances may be provided between adjacent segments of the separator 620. Alternatively, certain segments may be positioned adjacent to one another with no gap or approximately no gap between the segments.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A cable comprising:
   a twisted pair of insulated conductors extending lengthwise;
   a dielectric separator extending lengthwise with a cross-section comprising:
      a first portion positioned between the insulated conductors of the twisted pair, the first portion comprising a plurality of projections, each of the projections extending from the first portion towards one of the insulated conductors; and
      a plurality of additional portions extending at respective angles from the first portion so as to define respective cavities into which each of the insulated conductors is positioned; and
   a jacket formed around the twisted pair and the separator.

2. The cable of claim 1, further comprising:
   a carrier layer embedded in the first portion, the carrier layer comprising at least one of (i) one or more strength members, (ii) water swellable material, (iii) flame retardant material, (iv) smoke suppressant material, or (v) electrically conductive material.

3. The cable of claim 1, further comprising:
   a cavity extending longitudinally through the first portion; and
   at least one optical fiber positioned within the cavity.

4. The cable of claim 1, wherein an additional portion extends from the first portion in a plurality of directions.

5. The cable of claim 1, wherein a first of the plurality of additional portions extends at a first angle from the first portion, and
   wherein a second of the plurality of additional portions extends at a second angle from the first portion.

6. The cable of claim 1, wherein a first of the plurality of additional portions extends from a first end of the first portion, and
   wherein a second of the plurality of additional portions extends from an opposite end of the first portion.

7. The cable of claim 1, wherein the cross-section of the dielectric separator has one of an H-shape, a T-shape, an X-shape, a Z-shape, or an S-shape.

8. The cable of claim 1, wherein at least one of (i) the length of the first portion or (ii) the length of at least one of the plurality of additional portions is between approximately 0.05 inches and approximately 0.7 inches.

9. The cable of claim 1, further comprising one of (i) electrically conductive material, (ii) a strength member, or (iii) an optical fiber extending lengthwise and either embedded in the separator or disposed within a cavity of the separator.

10. The cable of claim 1, wherein the dielectric separator is scored at a plurality of locations along a longitudinal length of the separator.

11. The cable of claim 1, wherein one or more notches are formed in the dielectric separator at a plurality of locations along a longitudinal length of the separator.

12. A cable comprising:
a twisted pair of insulated conductors extending along a longitudinal length of the cable;
a separator helically twisted with the conductors and extending along the longitudinal length of the cable, a cross-section of the separator comprising:
a first portion positioned between the conductors; and
a plurality of second portions extending at respective angles from the first portion,
wherein the first portion and the plurality of second portions form respective cavities in which the insulated conductors are situated; and
a carrier layer embedded in the first portion, the carrier layer comprising at least one of (i) one or more strength members, (ii) water swellable material, (iii) flame retardant material, (iv) smoke suppressant material, or (v) electrically conductive material; and
a jacket formed around the twisted pair and the separator.

13. The cable of claim 12, wherein a respective length of both the first portion and at least one of the plurality of second portions is greater than or equal to one half the diameter of one of the insulated conductors.

14. The cable of claim 12, further comprising a plurality of projections, each projection extending from the first portion towards one of the conductors.

15. The cable of claim 12, wherein a first of the plurality of second portions extends from a first point along the first portion and a second of the plurality of second portions extends from a second point along the first portion.

16. The cable of claim 12, wherein the cross-section of the separator has one of an H-shape, a T-shape, an X-shape, a Z-shape, or an S-shape.

17. The cable of claim 12, wherein the first portion comprises a curved surface that faces one of the conductors.

18. The cable of claim 12, wherein the separator is scored at a plurality of locations along a longitudinal length of the separator.

19. The cable of claim 12, wherein one or more notches are formed in the separator at a plurality of location along a longitudinal length of the separator.

20. A cable comprising:
a twisted pair of insulated conductors;
a dielectric separator positioned between the insulated conductors of the twisted pair, the dielectric separator further defining longitudinally extending individual cavities in which each of the insulated conductors is positioned; and
a jacket formed around the twisted pair and the separator, wherein the dielectric separator is either scored or notched at a plurality of locations along its longitudinal length.

21. The cable of claim 20, wherein the dielectric separator has a cross-section comprising:
a first portion; and
a second portion extending at a first angle from a first location along a length of the first portion; and
a third portion extending at a second angle from a second location along a length of the first portion.

22. The cable of claim 21, further comprising a plurality of projections positioned between the conductors, each projection extending from the separator towards one of the conductors.

23. The cable of claim 20, wherein a cross-section of the dielectric separator has one of an H-shape, a T-shape, an X-shape, a Z-shape, or an S-shape.

24. The cable of claim 20, further comprising one of (i) electrically conductive material, (ii) a strength member, or (iii) an optical fiber extending lengthwise and either embedded in the separator or disposed within a cavity of the separator.

* * * * *